US009378605B2

(12) United States Patent
Koyama

(10) Patent No.: US 9,378,605 B2
(45) Date of Patent: Jun. 28, 2016

(54) GAMING MACHINE AND GAMING SYSTEM USING CHIPS

(75) Inventor: Toshimi Koyama, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 1283 days.

(21) Appl. No.: 12/206,879

(22) Filed: Sep. 9, 2008

(65) Prior Publication Data

US 2009/0075725 A1     Mar. 19, 2009

(30) Foreign Application Priority Data

Sep. 13, 2007 (JP) ................................ 2007-237459
Sep. 13, 2007 (JP) ................................ 2007-237460
Sep. 13, 2007 (JP) ................................ 2007-237461

(51) Int. Cl.
*A63F 9/24* (2006.01)
*G07F 1/06* (2006.01)
*G06Q 20/34* (2012.01)
*G07F 17/32* (2006.01)
*G07G 1/00* (2006.01)

(52) U.S. Cl.
CPC .............. *G07F 1/06* (2013.01); *G06Q 20/3415* (2013.01); *G07F 17/32* (2013.01); *G07F 17/322* (2013.01); *G07F 17/3241* (2013.01); *G07F 17/3251* (2013.01); *G07G 1/0072* (2013.01)

(58) Field of Classification Search
USPC ............................... 463/20, 25, 11, 29, 27, 30
See application file for complete search history.

(56) References Cited

U.S. PATENT DOCUMENTS

| 3,983,646 | A | * | 10/1976 | Howard ................... 40/27.5 |
| 5,735,742 | A | * | 4/1998 | French ..................... 463/25 |
| 5,781,647 | A | | 7/1998 | Fishbine et al. |
| 5,961,121 | A | | 10/1999 | Brown |
| 7,351,145 | B1 | * | 4/2008 | Ornstein et al. ........ 463/25 |
| 2004/0005920 | A1 | | 1/2004 | Soltys et al. |
| 2004/0137977 | A1 | * | 7/2004 | Fujimoto ................. 463/11 |
| 2006/0258427 | A1 | | 11/2006 | Rowe et al. |
| 2007/0077987 | A1 | | 4/2007 | Gururajan et al. |

(Continued)

FOREIGN PATENT DOCUMENTS

| CN | 1508744 A | 6/2004 |
| CN | 1519767 A | 8/2004 |
| CN | 1695174 A | 11/2005 |

(Continued)

OTHER PUBLICATIONS

Official Action in the corresponding to the Macao Patent Application No. I/860 issued on Aug. 23, 2010.

(Continued)

*Primary Examiner* — Paul A D'Agostino
*Assistant Examiner* — Brandon Gray
(74) *Attorney, Agent, or Firm* — Lex IP Meister, PLLC

(57) ABSTRACT

Gaming chips 30 have an IC tag 34 which is embedded therein, and a special bar code 101 invisible to the naked eye, which is printed thereon. A server calculates the number of gaming chips 30 based on individual information of the IC tag 34 that was read out by a reader 38, based on individual information of the special bar codes 101 read out by a bar code scanner 102, based on weight data acquired at a weighing device 40 and based on image data processed in a camera 103. Further, the server checks a partial number or the total number of gaming chips 30 thus calculated, and outputs the check results from a display or speaker.

8 Claims, 8 Drawing Sheets

(56) References Cited

U.S. PATENT DOCUMENTS

| | | | |
|---|---|---|---|
| 2008/0261687 A1* | 10/2008 | Gatzios | 463/29 |
| 2010/0093429 A1* | 4/2010 | Mattice et al. | 463/25 |

FOREIGN PATENT DOCUMENTS

| | | |
|---|---|---|
| EP | 1431937 A2 | 6/2004 |
| EP | 1431938 A2 | 6/2004 |
| JP | 6450024 | 10/1987 |
| JP | 01-223588 | 9/1989 |
| JP | 6134140 | 5/1994 |
| JP | 2001222225 | 8/2001 |
| JP | 2004-102953 | 4/2004 |
| JP | 2004213141 | 7/2004 |
| WO | 02064225 | 8/2002 |

OTHER PUBLICATIONS

Macao Economic Services Burea; International Form Search Report in Macao patent application No. I/1090 issued Oct. 27, 2011 and Notification of the Office Action from the State Intellectual Property Office of P.R.China mailed Oct. 13, 2011.
Japanese Office Action, Divisional application of the corresponding Japanese Application No. 2007-237461, Sep. 4, 2012.
Japan Patent Office, Office Action of JP2007-237459, Apr. 13, 2012.
Japan Patent Office, Office Action of JP2007-237460, Apr. 13, 2012.
Japan Patent Office, Office Action of JP2007-237461, Apr. 13, 2012.

* cited by examiner

FIG. 5

PTS SERVER 56

| | | | POCKET NUMBER | | | |
|---|---|---|---|---|---|---|
| | DEALER | | 8 | | | |
| PAST HISTORY | PARTICI-PANT P1 | BET NAME | BET AMOUNT | PAYOUT | PAYOUT AMOUNT | |
| | | CORNER (4,5,7,8) | 1$ | 9 TIMES | 9$ | |
| CURRENT HISTORY | PARTICI-PANT P2 | BET NAME | BET AMOUNT | PAYOUT | PAYOUT AMOUNT | |
| | | STRAIGHT (9) | 1$ | 36 TIMES | 0$ | |
| | PARTICI-PANT P3 | BET NAME | BET AMOUNT | PAYOUT | PAYOUT AMOUNT | |
| | | COLUMN (2to1) | 1$ | 3 TIMES | 0$ | |

GAMING MACHINE AND GAMING SYSTEM USING CHIPS

CROSS-REFERENCE TO RELATED APPLICATIONS

This application is based upon and claims a priority from the prior Japanese Patent Application No. 2007-237459 filed on Sep. 13, 2007, Japanese Patent Application No. 2007-237460 filed on Sep. 13, 2007, and Japanese Patent Application No. 2007-237461 filed on Sep. 13, 2007, the entire contents of which are incorporated herein by reference.

BACKGROUND

1. Field

The present invention relates to a gaming machine and a gaming system using gaming chips.

2. Description of Related Art

Conventional gaming machines and gaming systems using gaming chips employ gaming chips having a transponder embedded therein. In some gaming machines and gaming systems, when a radio signal sent from a gaming chip placed on a gaming table is detected at an antenna installed under that gaming table, a camera is redirected towards the area where that radio signal was generated, allowing a surveillance agent to track that gaming chip (refer to U.S. Pat. No. 5,735,742). However, a condition for blocking the radio signal may be established between the gaming chip and the antenna in such gaming machines and gaming systems. In this case, the antenna can no longer detect the radio signal from that gaming chip. Consequently, because these gaming machines and gaming system are provided with a single reading device only, it is likely that tracking of the gaming chip will be impossible. Accordingly, not only will tracking of the gaming chip become impossible, but at the same time, this will facilitate the use of counterfeit gaming chips.

SUMMARY

The present invention has been worked out in view of the above-described problems and an object thereof is to provide a gaming machine and a gaming system capable of improved accuracy in detecting counterfeit gaming chips.

To achieve the object of the disclosure, there is provided a gaming machine, comprising: a gaming board onto which gaming chips are placed; a first acquiring device that acquires first information with respect to the gaming chips on the gaming board; a second acquiring device that acquires second information with respect to the gaming chips on the gaming board; and a processor that executes processes (a) through (b) as follows, upon receiving said first information from the first acquiring device and said second information from the second acquiring device: (a-1) calculating the number of gaming chips on the gaming board, as a first detection number, based on said first information from the first acquiring device; (a-2) calculating the number of gaming chips on the gaming board, as a second detection number, based on said second information from the second acquiring device; and (b) checking said first detection number and said second detection number.

Furthermore, according to another aspect, there is provided a gaming system, comprising: a gaming machine including: a gaming board onto which gaming chips are placed; a first acquiring device that acquires first information with respect to the gaming chips on the gaming board; a second acquiring device that acquires second information with respect to the gaming chips on the gaming board; and a communication device; a server that manages the gaming machine, and, upon receiving, through the communication device, said first information from the first acquiring device, said second information from the second acquiring device, together with individual information on the gaming machine, executes processes (a) through (b) as follows: (a-1) calculating the number of gaming chips on the gaming board provided in the gaming machine, as a first detection number, based on said first information from the first acquiring device; (a-2) calculating the number of gaming chips on the gaming board provided in the gaming machine, as a second detection number, based on said second information from the second acquiring device; and (b) checking said first detection number and said second detection number.

BRIEF DESCRIPTION OF THE DRAWINGS

FIG. 5 is a view showing histories of roulette games;

DETAILED DESCRIPTION

Figure 1:
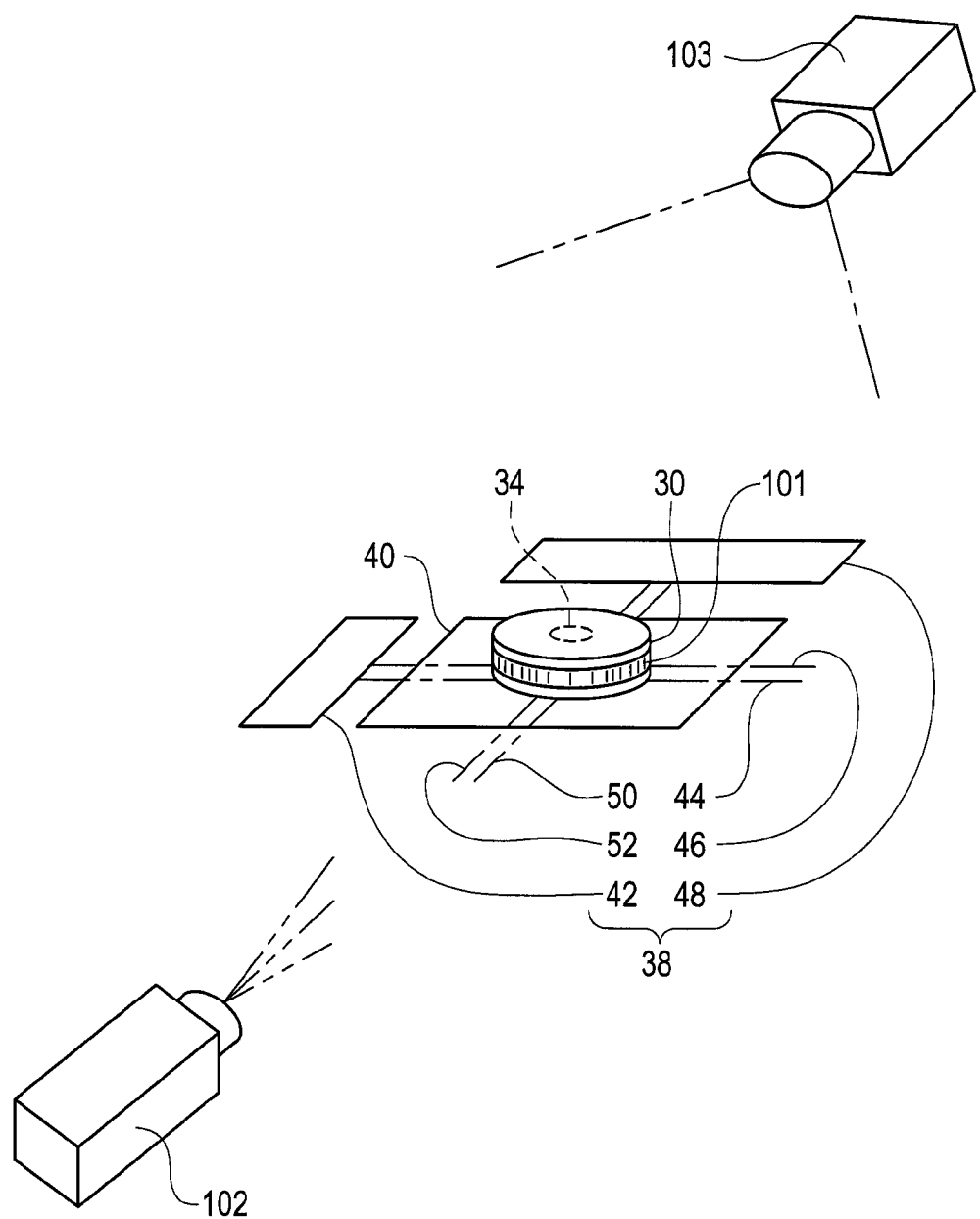
FIG. 1 is a view showing the characteristics of a gaming system according to one embodiment of the present invention, and also a view that shows a basic configuration of a reader.

Next, embodiments of the present invention will be described while referring to the accompanying drawings. The gaming system of the present embodiment is adapted to detect whether or not a gaming chip which has been placed on a betting board of a roulette is counterfeit. FIG. 1 is a view showing characteristics of a gaming system according to one embodiment of the present invention.

As shown in FIG. 1, in the gaming system of the present embodiment, an IC tag 34 is embedded in each gaming chip 30 which is used in a roulette. The gaming system also has a reader 38 that identifies a chip placing portion wherein a gaming chip 30 is placed on the betting board used in the roulette, and at the same time, reads out individual information stored in the IC tag 34 of the gaming chip 30. The reader 38 is constituted of an X-side transmitter antenna 44 and an X-side receiver antenna 46, and a Y-side transmitter antenna 50 and a Y-side receiver antenna 52 which are arranged so as to be orthogonal to one another at the respective chip placing portions on the betting board. The X-side transmitter antenna 44 and the X-side receiver antenna 46 extend parallel with each other from the X-side scan driver 42. The Y-side transmitter antenna 50 and the Y-side receiver antenna 52 extend parallel to each other from a Y-side scan driver 48.

A special bar code 101 which is invisible to the naked eye is printed at the periphery of a side surface of the gaming chip 30. A bar code scanner 102 is provided at the periphery of the betting board to read out individual information shown in the special bar code 101.

Weighing devices 40 are respectively provided at each chip placing portion of the betting board for measuring the weight of a gaming chip(s) placed at each chip placing portion. A camera 103 is provided at a periphery of the betting board for imaging an outer appearance of the gaming chips 30 placed at the chip placing portions.

A server of the gaming system according to the present embodiment calculates the number of gaming chips 30 that were placed at the chip placing portions of the betting board based on the individual information read out at the reader 38, based on the individual information read out at the bar code scanner 102, based on the weight data acquired at the weighing device 40 and based on the image data that was processed at camera 103. Further, the server checks a partial number or the total number of gaming chips 30 thus calculated, and outputs the check results from a display or a speaker controlled by the server.

Figure 2:
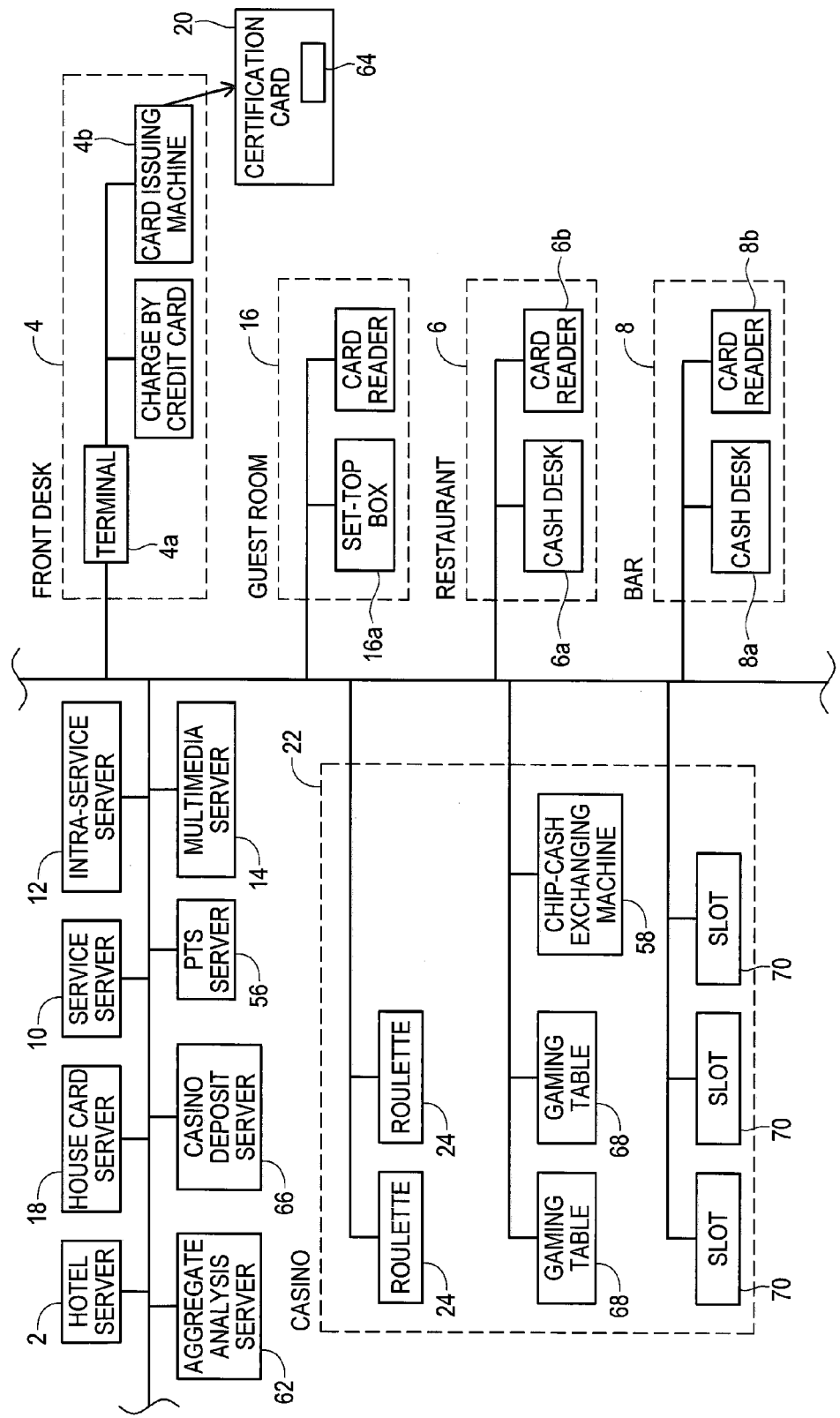
FIG. 2 is a configuration diagram of a casino/hotel system implementing the gaming system.

FIG. 2 is a configuration diagram showing a casino/hotel system implementing the gaming system according to the present embodiment and a gaming management system.

The hotel server 2 has various functions for carrying out integrated management such as a terminal 4a at a front desk 4, and cash desks 6a or 8a at a restaurant 6 or a bar 8. The service server 10 has various functions allowing booking or ticket issuing for various shows and events organized in that hotel. An intra-service server 12 has a function of managing an intranet provided inside the hotel. A multimedia server 14 has a function of supporting video on demand and game on demand in a set-top box 16a inside a guest room 16.

A house card server 18 has various functions of carrying out management of a certification card 20 which is referred to as a house card (card that allows identification of guests who stay at a hotel) and management of individual accounts. Each guest is issued a certification card (house card) 20 upon checking in at that casino/hotel. This certification card 20 is issued at a card issuing machine 4b at the front desk 4 and serves to identify that guest. Upon presenting and having the certification card 20 checked, guests are allowed to use all the other facilities inside that casino/hotel. The expenses amount is accumulated at the hotel server 2 when the certification card 20 is read by a card reader 6b or 8b at the cash desk 6a or 8a in the restaurant 6 or bar 8 inside the hotel. Upon checkout, the total expenses amount is shown on terminal 4a at the front desk 4. The certification card 20 can be linked to various management systems other than the gaming management system described above. The certification card 20 also has the function of a credit card and can be used at least for purchasing merchandise or for dining.

The gaming management system in such casino/hotel has various functions for managing various games in the casino 22. In the following description, it is assumed that various games are executed wherein the pocket number of a roulette ball 28 thrown onto the roulette board 26 is anticipated and gaming chips 30 are bet at a chip placing portion corresponding to that pocket number (refer to FIG. 3 through FIG. 5).

Figure 3:
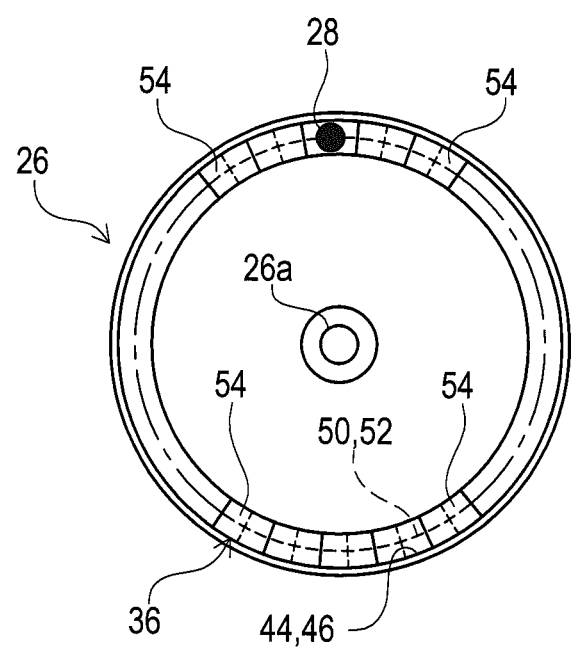
FIG. 3 is a plan view showing a configuration of a roulette board.
Figure 4:
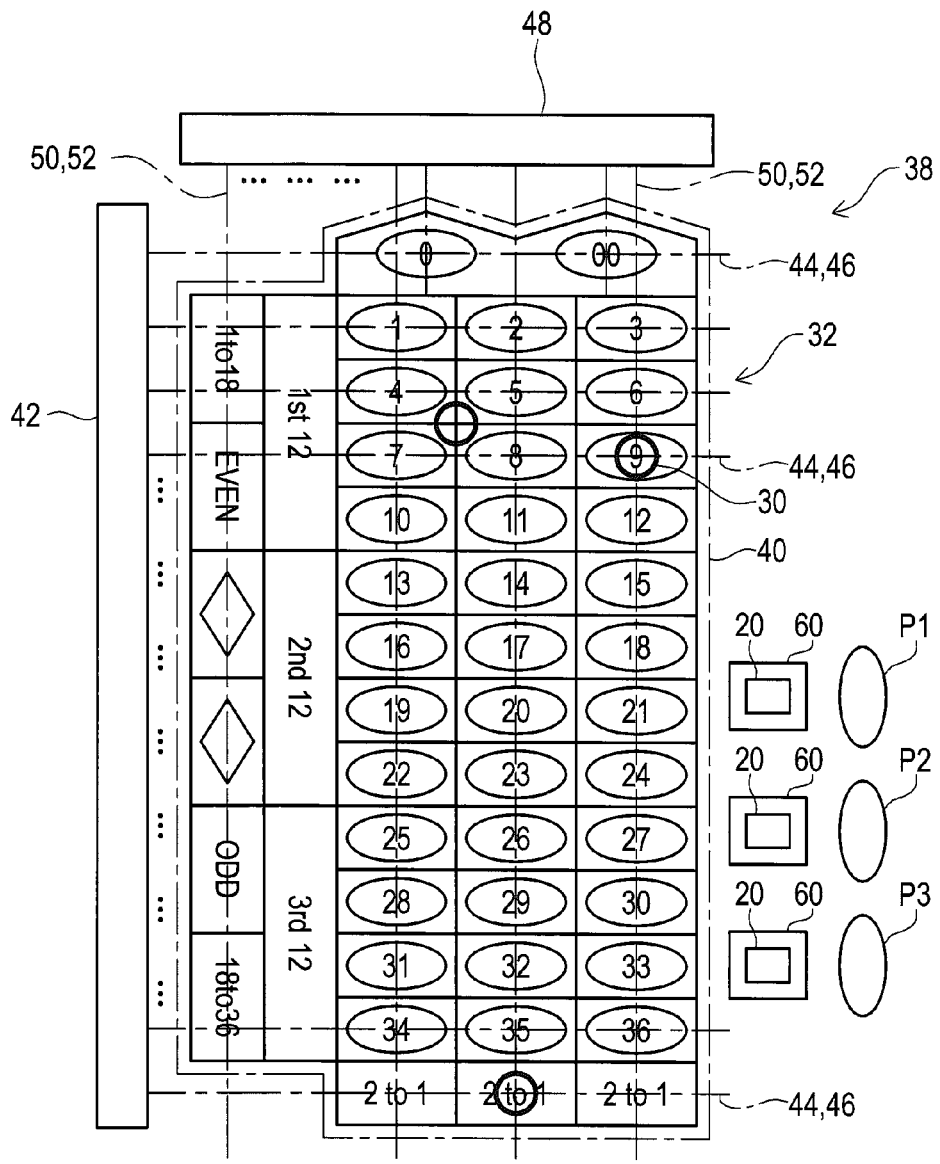
FIG. 4 is a plan view showing a configuration of a betting board.

As shown in FIG. 1, FIG. 3 and FIG. 4, such a gaming management system has a betting board 32, an IC tag 34, a pocket number detecting device 36, a reader 38 and a payout amount calculating device (not shown). The betting board 32 comprises a plurality of chip placing portions (for instance, each spot being segmented into numbers such as 0, 00, 1, 2, . . . , 35, 36) which are allocated so as to correspond to respective pocket numbers on the roulette board 26, and is used for betting gaming chips 30. The IC tag 34 is provided in the gaming chips 30 and is used for storing individual information with respect to the gaming chips 30. The pocket number detecting device 36 is provided in the roulette board 26 and is adapted to detect the pocket number and the pocket type for the roulette ball 28 on the roulette board 26. A reader 38 is provided in the betting board 32 and is adapted to detect the bet name and the value of the gaming chips 30 when gaming chips are bet on the chip placing portion by reading the individual information with respect to the gaming chips 30 as stored in IC tag 34. The payout amount calculating device calculates the payout amount in the game (roulette game) based on the position of the roulette ball 28 on the roulette board 26 and the bet name and the value of the gaming chips 30.

The IC tag 34 is embedded in the gaming chips 30 as micro radio tag. The individual information with respect to the gaming chips 30 includes information with respect to an inherent number for identifying each gaming chip 30 (number for identifying the gaming chips), value (1 dollar, 5 dollar, 10 dollar, etc.) and color of the gaming chips 30, the place where the gaming chips 30 are usable (casino 22).

The reader 38 is made up of the X-side transmitter antenna 44 and the X-side receiver antenna 46, and the Y-side transmitter antenna 50 and the Y-side receiver antenna 52 which are arranged so as to be orthogonal to one another at each chip placing portion on the betting board 32, as shown in FIG. 1. The X-side transmitting antenna 44 and the X-side receiving antenna 46 extend parallel to each other from the X-side scan driver 42. The Y-side transmitter antenna 50 and the Y-side receiver antenna 52 extend in parallel to each other from the Y-side scan driver 48.

The basic configuration of the pocket number detecting device 36 is the same as that of the reader 38.

Once the gaming chips 30 have been bet on the chip placing portion on the betting board 32, for instance, a scanning radio wave is generated from the X-side transmitter antenna 44 and the Y-side transmitter antenna 50. Then, in the reader 38, a read radio wave rises from a vicinity of a cross point between these antennas. This read radio wave is received at the X-side receiver antenna 46 and the Y-side receiver antenna 52. However, when gaming chips 30 are bet in the vicinity of that cross point, a change in the receiving state occurs in response to a change in impedance caused by the dielectric properties of the gaming chips 30. When this change is detected, a judgment is made with respect to the presence of gaming chips 30. At the same time, when a signal is received from the IC tag (micro radio tag) 34 at the X-side receiver antenna 46 and the Y-side receiver antenna 52, the value (1 dollar, 5 dollar, 10 dollar, etc.) and the inherent number (number for identifying the gaming chips) of the gaming chips 30 are read.

Here, a case is described wherein the reader 38 having this basic configuration is applied to the pocket number detecting device 36. As shown in FIG. 3, the roulette board 26 has a circular rotating body configuration and has a total of 38 pockets 54 (FIG. 3 shows only one portion of these pockets) arranged in a concentric pattern with respect to a center axis 26a. A number is printed on each pocket 54 so as to correspond to a plurality of chip placing portions (spots segmented into numbers, for instance, 0, 00, 1, 2, . . . , 35, 36) which have been allocated on the betting board 32.

The pocket number detecting device 36 is provided with respect to each of the 38 pockets 54. When the roulette ball 28 enters in a pocket 54, the roulette ball 28 is positioned on the cross point mentioned earlier with respect to the reader 38. Because the read radio wave mentioned above is normally in a risen state during the game, when the roulette ball 28 is positioned on the cross point, only the receiving state of that pocket 54 changes. As a result, the pocket number detecting device 36 can detect whether the roulette ball 28 has entered any position (any pocket 54) on the roulette board 26. The data that was thus detected is transmitted to a PTS (Player Tracking System) server 56, and histories thereof are managed collectively (FIG. 5).

Alternatively, as shown in FIG. 4, a plurality of chip placing portions are formed on the betting board 32. The X-side transmitter antenna 44 and the X-side receiver antenna 46, and the Y-side transmitter antenna 50 and the Y-side receiver antenna 52 of the reader 38 are laid down so as to form a cross point at each chip placing portion. When gaming chips 30 have been betted on the chip placing portion (for instance, 9: straight) on the betting board 32, that gaming chip 30 is positioned on the cross point as described earlier. Because the read radio wave mentioned above is normally in a risen state during the game, when the gaming chips 30 are positioned on the cross point, a change occurs only in the receiving state of that chip placing portion. As a result, the pocket number detecting device 36 can detect whether or not gaming chips 30 have been betted on any of the bet names on the betting board 32. The data that was thus detected is transmitted to a PTS server 56, and histories thereof are managed collectively (FIG. 5).

The weighing device 40 is provided with respect to each chip placing portion so as to cover the betting area of the betting board 32 and can adopt an electronic weighing instrument, such as a semiconductor pressure sensor, etc., for instance. The weighing device 40 stores information on the chip weight for one gaming chip 30 and calculates the number of gaming chips 30 that were bet by dividing a total weight value of the gaming chips 30 that were bet on the betting board 32 by the weight of 1 chip.

The roulette ball 28 has an IC tag (not shown) which stores roulette ball identifying information for identifying the roulette ball 28. This IC tag is embedded in the roulette ball 28 as a micro radio tag. The roulette ball identifying information includes information on the origin of the roulette ball 28 and the places where it can be used (casino 22), as well as the type and the like of the ball.

The roulette ball identifying information stored on the IC tag can be read by the pocket number detecting device 36. Then, based on the information thus read, it is possible to distinguish between the roulette balls 28 that can be used and those that cannot be used. This makes it possible to fully prevent fraudulent acts or infringement acts such as contraband and usage of counterfeit roulette balls 28.

In such a gaming management system, characters P1, P2 and P3 who desire to play the roulette 24 in casino 22 (FIG. 2), enter the casino 22 with the certification card 20 as described earlier, and purchase a desired number of gaming chips 30 at a chip-cash exchange machine 58. Then, they set the certification card 20 in the reading device 60 of the betting board 32. At this time, the reading device 60 reads the contents of the certification card 20, identifying the characters P1, P2 and P3 and recognizing them as participants. The recognition data thus obtained at the reading device 60 is transmitted to the PTS server 56, and the participants P1, P2 and P3 are thus registered in the current game (FIG. 5). The reading method (magnetic reading method, optical reading method) can be randomly set in accordance with the recording scheme (magnetic recording, optical recording) of the certification card 20.

In the roulette game, a dealer first throws in the roulette ball 28 so as to go round the roulette board 26. In the meantime, participants P1, P2 and P3 bet the gaming chips 30 they have in hand on a chip placing portion of the betting board 32. Here, to give one example, participant P1 bets on corner (4, 5, 7, 8), participant P2 bets on straight (9), and participant P3 bets on column (2 to 1) (FIG. 5). The reader 38 then detects the bet name and value (1 dollar, 5 dollar, 10 dollar, etc.: the bet amount) for each participant P1, P2 and P3, and transmits the detected results to the PTS server 56, where histories thereof are managed collectively.

When the rotation of the roulette board 26 slows down, the roulette ball 28 enters a pocket 54. If the number of this pocket 54 is "8", a detection is made at the pocket number detecting device 36 that the pocket number of the roulette ball 28 is "8". The detection result is then transmitted to the PTS server 56, where histories thereof are managed collectively.

An aggregate analysis server 62 has a payout amount calculating device (not shown) provided therein for calculating the payout amount for that game (roulette game) based on the position (pocket 8) of the roulette ball 28 on the roulette board 26, and the bet name and the value (bet amount) of the gaming chips 30 (FIG. 5).

In the embodiment described above, the gaming chips 30 are bet directly. In addition, the certification card 20 has a deposit checking portion 64 (refer to FIG. 2) which allows to check the amount of the deposit that the user has. The participants can thus enjoy the roulette game based on the check results of the deposit checking portion 64, in place of the gaming chips 30. In this case, participants P1, P2 and P3 can bet a random amount using a bet amount input device (keypad, etc.) (not shown) which is provided near the participant's hands. Then, as is the case with the gaming chips 30 as described above, all bet amounts are sequentially registered in the PTS server 56 and are uniformly managed in the aggregate analysis server 62. Management of deposits inside the casinos is carried out collectively at the casino deposit server 66 (FIG. 2). An update process of the deposit balance in accordance with the game score, as well as a payout process in the case that the participant desires a new deposit can be carried out without using cash.

According to this gaming management system, since all history from the beginning till the end of the game can be managed, fraudulent gaming and fraudulent operations which occurred in conventional art can be prevented. More specifically, the position of the roulette ball 28 and the bet name of the gaming chips 30 are always monitored by the pocket number detecting device 36 and the reader 38. Thus, if counterfeit roulette balls or counterfeit chips are mixed in with the regular ones in the game, the counterfeit objects can be promptly identified, making it possible to prevent fraudulent gaming. Even in the event the dealer and participants P1, P2 and P3 conspire together to commit a fraudulent act, the timing of that fraudulent operation and the flow of the roulette ball 28 and the gaming chips 30 at that time can be accurately grasped based on the history managed collectively in the PTS server 56. This makes it possible to prevent fraudulent operations.

In the gaming machines such as the gaming table 68 or the slot machine 70, etc. installed in the casino 22, gaming chips 30 may be issued and managed manually by the dealer, etc. Further, the chip-cash exchanging machine 58 may be installed so as to be integral with these gaming machines. In this case, a dealer, etc. stands by each of these gaming machines. Thus, in the event some trouble should occur at the chip-cash exchanging machine 58, there is no longer need to call for a clerk, making it possible to skip the time until his/her arrival at the machine. This also makes it possible to reduce maintenance staff for the chip-cash exchanging machine 58.

According to the present embodiment, the certification card (house card) 20 which is handed to the guests upon checking in at the hotel enables them to use all facilities in that hotel. This makes it possible to offer a fine service to the users which could not be successfully achieved in conventional art. In particular, in conventional art, gaming expenses at the casinos used to be in a separate account, which was inconvenient for the casino users as they had to manage their resources on their own. With the certification card 20, however, all expenses can be settled together upon checkout, reducing the burden on the casino users.

Usage of the deposit function attached to the certification card 20 makes it possible to prevent unlimited gaming. Thus, an excessive losing history can be avoided, allowing the player to enjoy playing a game without any anxiety.

Although description was omitted, the gaming machines such as the gaming tables 68 and the slot machines 70, etc. installed in the casino 22 as well, can be used with the certification card 20. The gaming histories at these machines can be registered in the PTS server 56 in the form showed in FIG. 5, and can be managed collectively therein.

Next, the gaming system according to the present embodiment will be described. The gaming system according to the present embodiment constitutes a casino/hotel system as shown in FIG. 2, similarly with the gaming management system described earlier.

As was shown in FIG. 1, a special bar code 101 invisible to the naked eye is printed at the periphery of a side surface of the gaming chips 30 used in each roulette 24 (refer to FIG. 1). The special bar code 101 may adopt an infrared ray emitting fluorescent material and shows individual information with respect to the gaming chips 30. The individual information with respect to the gaming chips 30 includes information with respect to an inherent number for identifying the respective gaming chips 30 (number for identifying the gaming chips), the value (1 dollar, 5 dollar, 10 dollar, etc.) and the color of the chips, the place where the gaming chips 30 can be used (casino 22). In this respect, it is similar with the IC tag 34 embedded in the gaming chips 30.

As shown in FIG. 1, a bar code scanner 102 is provided at the periphery of the betting board 32 for reading the individual information shown in the special bar code 101. Further, a camera 103 is provided at the periphery of the betting board 32 for imaging an outer appearance of the gaming chips 30 that were placed at each chip placing portion, as shown in FIG. 1.

Any special bar code 101 may be used so long as it is invisible to the naked eye but can be read by the bar code scanner 102. Accordingly, the special bar code 101 is not limited to a code that was printed using an infrared ray emitting fluorescent body. For instance, the special bar code 102 may include a bar code that was printed using a special ink which can be read by the bar code scanner 102 using black light such as ultraviolet rays.

Figure 6:
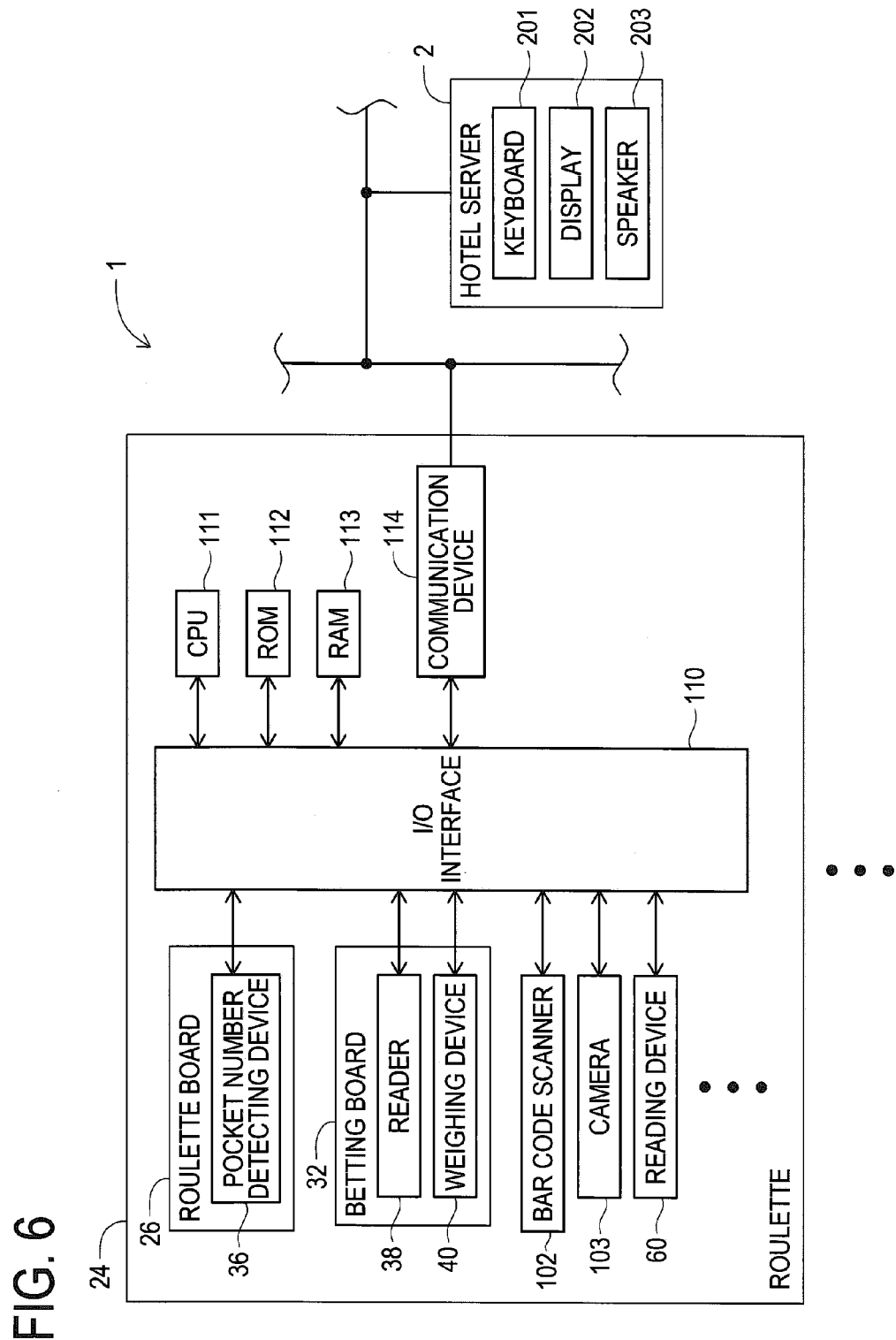
FIG. 6 is a block diagram showing an internal configuration of the gaming system.

FIG. 6 is a block diagram showing an internal configuration of the gaming system 1 according to the present embodiment. As shown in FIG. 6, the gaming system 1 according to the present embodiment is constituted of respective roulettes 24 and the hotel server 2.

Each roulette 24 has a CPU 111, a ROM 112 and a RAM 113. The CPU 111 operates based on programs stored in the ROM 112. The CPU 111 carries out signal input/output operations with the other constituent elements through an I/O interface 110, controlling all operations of the roulette 24. The ROM 112 stores programs that will be executed by the CPU 111, as well as permanent data. The RAM 113 stores data and programs used when the CPU 111 operates.

To the I/O interface 110 are connected the pocket number detecting device 36 of the roulette board 26, the reader 38 and the weighing device 40 of the betting board 32, the bar code scanner 102, the camera 103, the respective reading devices 60 and the communication device 114, and the like. The communication device 114 transmits the various signals inputted through the I/O interface 110 to the hotel server 2, together with the individual information of the respective roulette 24.

The hotel server 2 includes a computer that has input/output devices such as a keyboard 201, a display 202, a speaker 203, and the like.

Figure 7:
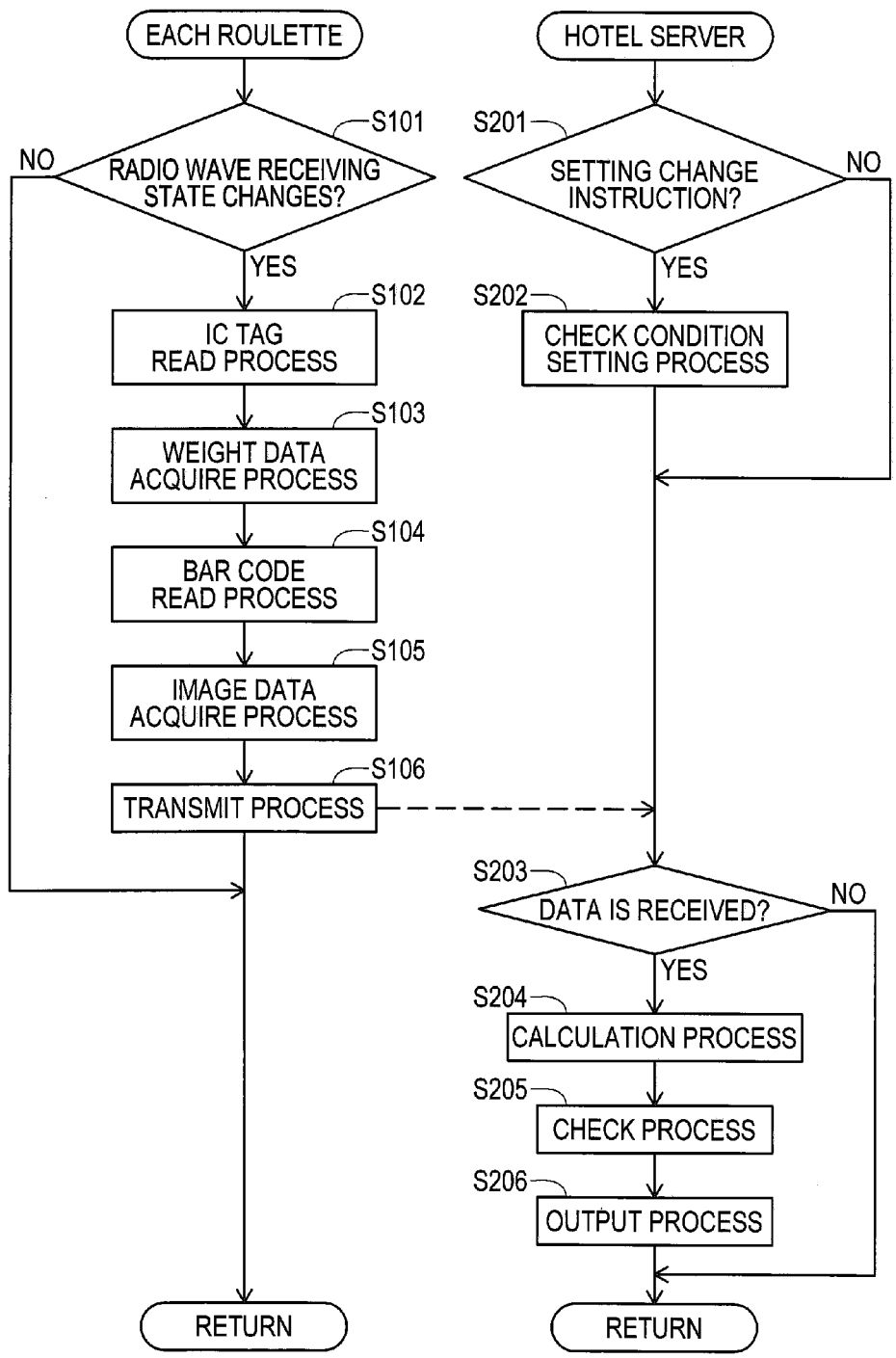
FIG. 7 is a flow chart of a main control program.

Next, a detailed description will now be given with respect to a main control program which is executed in the gaming system 1 according to the present embodiment, while referring to the accompanying drawings. FIG. 7 is a flow chart showing a main control program. As a result of executing this main control program, a detection is made on whether or not the gaming chips 30 placed on the betting board 32 of each roulette 24 are counterfeit.

At each roulette 24, as shown in FIG. 7, the CPU 111 first determines, at step S101 whether a change occurred in the receiving state. This determination is carried out based on the receiving state with respect to read radio waves of the reader 38. Here, if no change occurs in the receiving state (S101: NO), the CPU 111 executes the main control program once again. Alternatively, if a change occurs in the receiving state (S101: YES), the flow proceeds to step S102.

At step S102, the CPU 111 carries out an IC tag read process. In this IC tag read process, the CPU 111 reads the individual information stored in the IC tag 34 of the gaming chips 30, through the reader 38. At the same time, the CPU 111 identifies the bet placing portion on the betting board 32 where those gaming chips 30 have been placed and converts this data into transmit data. Then, the flow proceeds to step S103.

At step S103, the CPU 111 carries out a weight data acquire process. In this weight data acquire process, the CPU 111 acquires a total weight value (weight data) of the gaming chips 30 thus placed at the weighing device 40, based on each bet placing portion on the betting board 32 that was identified at step S102. The CPU 111 then converts this into transmit data. Then, the flow proceeds to step S104.

At step S104, the CPU 111 carries out a bar code read process. In this bar code read process, the CPU 111 reads out, using the bar code scanner 102, the individual information shown in the special bar code 101 of the gaming chips 30 thus placed, with respect to each chip placing portion of the betting board 32 as identified at step S102. The CPU 111 then converts this into transmit data. Then, the flow proceeds to step S105.

At step S105, the CPU 111 carries out an image data acquire process. In this image data acquire process, the CPU 111 acquires, using the camera 103, image data of the gaming chips 30 thus placed, with respect to each chip placing portion on the betting board 32 as identified at step S102. The CPU 111 then converts this into transmit data. Then, the flow proceeds to step S106.

At step S106, the CPU 111 carries out a transmit process. In this transmit process, the CPU 111 transmits the transmit data obtained at steps S102, S103, S104 and S105 together with data for identifying the roulette 24 and the chip placing portion on the betting board 32 to the hotel server 2 through the communication device 114. Then, the CPU 111 executes this main control program once again.

Alternatively, at step S201, the hotel server 2 determines whether a setting change instruction has been issued. This determination is carried out based on the input signal from the keyboard 201. Here, if the setting change instruction has been issued (S201: YES), the flow proceeds to step S203, after passing through a check condition setting process at step S202 as will be described later. Alternatively, if the setting change instruction has not been issued (S201: NO), the flow proceeds to step S203.

At step S203, the hotel server 2 determines whether or not data is received. This determination is carried out depending on whether the respective transmit data has been received from the roulette 24. Here, if data is not received (S203: NO), the CPU 111 executes the main control program once again. Alternatively, if data is received (S203: YES), the flow proceeds to step S204.

At step S204, the hotel server 2 carries out a calculation process. In this calculation process, the CPU 111 identifies the roulette 24 and the chip placing portion on the betting board 32 based on the respective transmit data from the roulette 24. Then, the CPU 111 respectively calculates the number of gaming chips 30 that were placed on the chip placing portion thus identified.

The calculation of the number of gaming chips 30 will now be described in more detail. First, individual information that was read out at the reader 38 and stored in the IC tag 34 of the gaming chips 30 is subject to an analysis process at the hotel server 2, whereby the number of gaming chips 30 is calculated. The total weight value (weight data) acquired at the weighing device 40 is subject to an analysis process at the hotel server 2, whereby the number of gaming chips 30 is calculated. The chip weight for one gaming chip 30 is stored in the hotel server 2, so that the number of gaming chips 30 that were bet can be calculated by dividing the total weight value of the gaming chips 30 that were bet on the betting board 32 by the weight of 1 chip.

The number of gaming chips 30 is calculated as a result of subjecting the image data acquired by the camera 103 to an image process in the hotel server 2. With respect to this, information concerning the gaming chips 30 required for the image process is stored in the hotel server 2. Thus, by using this information in the image process, it is possible to calculate the number of gaming chips 30, and in addition, it is possible to analyze the value (1 dollar, 5 dollar, 10 dollar or the like) and the color of the gaming chips 30. The individual information that was read out at the bar code scanner 102 and is showed in the special bar code 101 of the gaming chip 30 is analyzed in the hotel server 2, whereby the number of gaming chips 30 is calculated.

Then, the flow proceeds to step S205, at which the hotel server 2 carries out a check process. In this check process, the hotel server 2 calculates a check result on whether the numbers of gaming chips 30 match, by comparing the respective numbers of gaming chips 30 that were calculated at step S204. Then, the flow proceeds to step S206.

At step S206, the hotel server 2 executes again this main control program, after having executed an output process. In this output process, the hotel server 2 outputs the check results at step S205 to the display 202 and the speaker 203. More specifically, in addition to the check results on whether the numbers of gaming chips 30 match, the display 202 also displays the roulette 24 and the chip placing portions on the betting board 32 as associated with these check results in a clear manner. Also, a warning beep is outputted from the speaker 203 in the event that the number of gaming chips 30 do not match.

This warning beep is continuously outputted until the operator inputs a cancel instruction through the keyboard 201. The check results obtained at step S205 are outputted not only to the display 202 and the speaker 203 constituting the hotel server 2, but may also be outputted to an output device which is connected to the casino/hotel system as shown in FIG. 2.

There are 4 check items in the check process at step S205. More specifically, these 4 items include: the number of gaming chips 30 that was calculated using the individual information stored in the IC tag 34 of the gaming chips 30 (hereinafter referred to as [first number]); the number of gaming chips 30 that was calculated using the total weight value (weight data) acquired at the weighing device 40 (hereinafter referred to as [second number]); the number of gaming chips 30 that was calculated using the image data acquired by the camera 103 (hereinafter referred to as [third number]); and the number of gaming chips 30 that was calculated using the individual information shown in the special bar code 101 of the gaming chips 30 (hereinafter referred to as [fourth number]). The determination concerning which calculated number of chips is set as a check item is made based on the setting results in the check condition setting process at step S202.

In the check condition setting process at step S202, the hotel server 2 sets the check items in the check process at step S205 to at least 2, through an operator's setting instruction using the keyboard 201. Accordingly, there are 11 combinations of check items, obtained by combining at least 2 of the [first number], [second number], [third number] and [fourth number]. These combinations are set by an operator, while taking into consideration system differences and the degree of accuracy.

As was described earlier in detail, in the gaming system 1 according to the present embodiment, if the check results in the check process at step S205 do not match, a determination is made that counterfeit gaming chips have been detected. In the check condition setting process at step S202, the operator selects and combines at least two or more of the [first number], [second number], [third number] and [fourth number], as combinations of check items in the check process. This helps improve accuracy in detecting counterfeit gaming chips.

The check results of that check process are outputted to the display 202 and the speaker 203 in the output process at step S206. Thus, a fraudulent act (for instance, when the check results do not match, use of counterfeit gaming chips, etc.) can be notified to the exterior in real time.

The individual information for calculating [the fourth number] is shown in the special bar code 101 printed on the gaming chips 30. This special bar code 101 may adopt an infrared ray emitting fluorescent body, for instance, which is invisible to the naked eye, thus allowing detection of counterfeit gaming chips to be carried out in a confidential fashion.

The present invention is not limited to the embodiments described above, and various modifications can be made thereto without departing from the spirit of the present invention.

For instance, in the roulette 24, the number of gaming chips 30 may be respectively calculated in each of the processes at steps S102, S103, S104 and S105, after which this may be converted to transmit data. This transmit data may be transmitted to the hotel server 2 in the transmit process at step S106. In this case, the calculation process carried in the hotel server 2 at step S204 can be omitted.

The respective processes at steps S201 through S206 may be carried out in the roulette 24, in place of the hotel server 2, by installing therein various input/output devices such as a keyboard 201, a display 202 and a speaker 203. In this case, the counterfeit gaming chips can be detected independently in the roulette 24.

The present invention is applicable to betting boards which are used in other games, such as card games or dice games, etc.

Figure 8:
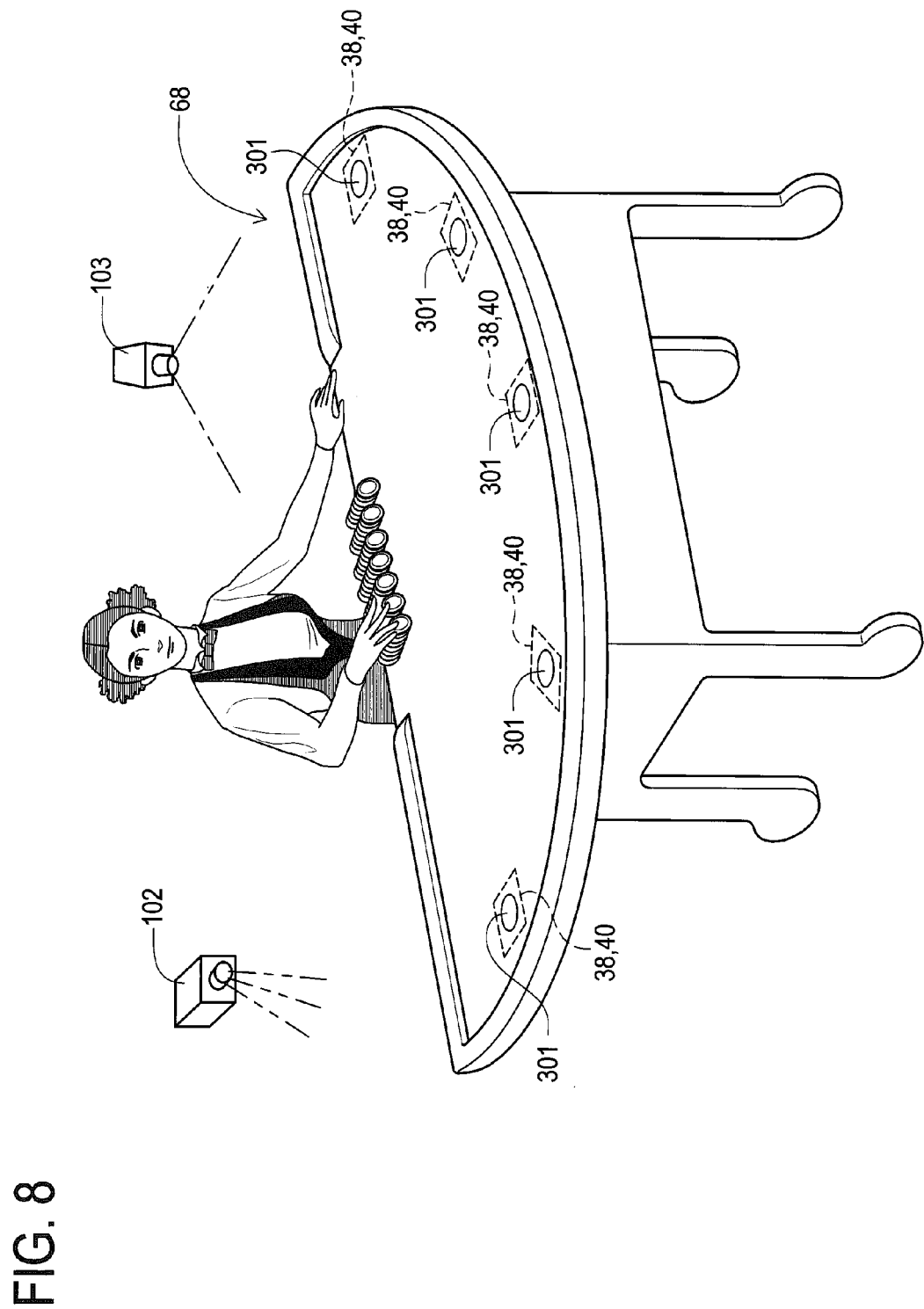
FIG. 8 is a perspective view showing a gaming table to which the present invention is applied.

The present invention is also applicable to a gaming table 68 wherein a card game or a dice game, etc. is progressed by a dealer. As shown in FIG. 8, an individual chip placing portion 301 is provided in the gaming table 68 with respect to each game participant. In this case, a reader 38 and a weighing device 40 are provided in the gaming table 68 with respect to each individual chip placing portion 301 in the gaming table 68. Further, the bar code scanner 102 and the camera 103 are provided at the periphery of the gaming table 68.

The bar code scanner 102 and the camera 103 may be installed with respect to each individual chip placing portion 301 of the gaming table 68. Also, one reader 38 may be installed with respect to the entire gaming table 68.

Also, there is no limitation on the number of bar code scanners 102, the cameras 103, the readers 38, the weighing devices 40, etc. Needless to say, a larger number of such devices results in higher accuracy in detecting counterfeit gaming chips.

Also, there is no limitation on the type of acquiring devices such as the bar code scanner 102, the camera 103, the reader 38, the weighing device 40 and the like. Needless to say, the provision of more types of such devices results in higher accuracy in detecting counterfeit gaming chips.

What is claimed is:

1. A gaming machine comprising:
    a gaming board onto which gaming chips to be bet are placed, each of the gaming chips having therein a built-in IC tag;
    a first acquiring device that acquires first information for obtaining first number information of the gaming chips, the first number information being information on a number of the gaming chips currently put on the gaming board;
    a second acquiring device that acquires second information for obtaining second number information of the gaming chips, the second number information being information on the number of the gaming chips currently put on the gaming board;
    a third acquiring device that acquires third information for obtaining third number information of the gaming chips, the first number information being information on the number of the gaming chips currently put on the gaming board;
    a processor that calculates the first number information, the second number information, and the third number information based on said first information from the first acquiring device, said second information from the second acquiring device, and third information from the third acquiring device, respectively; and
    an input device that selects at least two check items among the first number information, the second number information, and the third number information,
    wherein the processor executes processes as follows:
    (a) checking whether or not the at least two check items match each other;
    (b) outputting check results in the process (a) to an output device;
    (c) executing a game; and
    (d) performing a payout process based on a result of the game and a bet amount of the gaming chips.

2. The gaming machine according to claim 1, further comprising:
    a camera that functions as the first acquiring device and is adapted to acquire image data including imaging of the gaming chips on the gaming board, as said first information;
    a reader that functions as the second acquiring device and is adapted to read individual information stored in the IC tags of the gaming chips on the gaming board, as said second information;
    identification codes provided in the gaming chips placed on the gaming board; and
    a reader that functions as the third acquiring device and is adapted to read individual information shown in the identification codes of the gaming chips on the gaming board, as said third information.

3. The gaming machine according to claim 2, wherein the identification codes of the gaming chips have optically transparent properties in a visible range, and are read out through invisible light rays by the reader.

4. The gaming machine according to claim 1, further comprising:
    a meter that functions as a fourth acquiring device and is adapted to acquire weight data for the gaming chips on the gaming board, as fourth information.

5. A gaming system, comprising:
    a gaming machine including: a gaming board onto which gaming chips are placed, each of the gaming chips having therein a built-in IC tag; a first acquiring device that acquires first information for obtaining first number information of the gaming chips, the first number information being information on a number of the gaming chips currently put on the gaming board; a second acquiring device that acquires second information for obtaining second number information of the gaming chips, the second number information being information on the number of the gaming chips currently put on the gaming board; a third acquiring device that acquires third information for obtaining third number information of the gaming chips, the second number information being information on the number of the gaming chips currently put on the gaming board; and a communication device;
    a server that manages the gaming machine, calculates the first number information, the second number information, and the third number information based on said first information from the first acquiring device, said second information from the second acquiring device, said third information from the third acquiring device, respectively, and selects at least two check items among the first number information, the second number information and the third number information, corresponding to an instruction input through an input device,
    wherein the server executes processes as follows:
    (a) checking whether or not numbers the at least two check items match each other,
    (b) outputting check results in the process (a) to an output device,
    (c) executing a game, and
    (d) performing a payout process based on a result of the game and a bet amount of the gaming chips.

6. The gaming machine according to claim 5, further comprising:
    a camera that functions as the first acquiring device and is adapted to acquire image data including imaging of the gaming chips on the gaming board, as said first information;
    a reader that functions as the second acquiring device and is adapted to read individual information stored in the IC tags of the gaming chips on the gaming board, as said second information;
    identification codes provided in the gaming chips placed on the gaming board; and
    a reader that functions as the third acquiring device and is adapted to read individual information shown in the identification codes of the gaming chips on the gaming board, as said third information.

7. The gaming machine according to claim 6, wherein the identification codes of the gaming chips have optically transparent properties in a visible range, and are read out through invisible light rays by the reader.

8. The gaming machine according to claim 5, further comprising: a meter that functions as a fourth acquiring device and is adapted to acquire weight data for the gaming chips on the gaming board, as fourth information.

* * * * *